(12) United States Patent
Bivens et al.

(10) Patent No.: US 8,066,889 B2
(45) Date of Patent: Nov. 29, 2011

(54) METHOD FOR FILTERING COOKING OIL USED IN FRYING PROCESS

(75) Inventors: Thomas Bivens, Magnolia, TX (US); J. Garrieth Clark, Signal Mountain, TN (US)

(73) Assignee: Masterfil, Inc., Magnolia, TX (US)

( * ) Notice: Subject to any disclaimer, the term of this patent is extended or adjusted under 35 U.S.C. 154(b) by 55 days.

(21) Appl. No.: 12/383,576

(22) Filed: Mar. 26, 2009

(65) Prior Publication Data

US 2009/0250414 A1    Oct. 8, 2009

Related U.S. Application Data

(60) Division of application No. 11/402,769, filed on Apr. 13, 2006, which is a continuation-in-part of application No. 11/179,933, filed on Jul. 12, 2005.

(60) Provisional application No. 60/587,347, filed on Jul. 13, 2004.

(51) Int. Cl.
*B01D 37/00* (2006.01)
*A47J 37/12* (2006.01)

(52) U.S. Cl. ............ 210/767; 99/403; 210/167.28; 210/503; 210/805; 210/774

(58) Field of Classification Search ............ 99/403–410; 210/167.28, 175, 184, 257.1, 258, 483, 484, 210/499, 503–505, 767, 774, 805, 808, DIG. 8
See application file for complete search history.

(56) References Cited

U.S. PATENT DOCUMENTS

| | | | |
|---|---|---|---|
| 3,107,601 A | 10/1963 | Longmire | |
| 3,279,605 A | 10/1966 | Shepherd | |
| 3,477,361 A | 11/1969 | Bradshaw | |
| 4,517,082 A | 5/1985 | Prudhomme | |
| 4,689,058 A * | 8/1987 | Vogt et al. | 96/135 |
| 4,805,525 A | 2/1989 | Bivens | |
| 4,888,234 A | 12/1989 | Smith et al. | |
| 4,959,144 A | 9/1990 | Bernard et al. | |
| 4,962,698 A * | 10/1990 | Drijftholt et al. | 99/408 |
| 5,019,254 A * | 5/1991 | Abrevaya et al. | 210/616 |
| 5,075,000 A | 12/1991 | Bernard | |
| RE34,636 E | 6/1994 | Bivens | |
| 5,404,799 A | 4/1995 | Bivens | |
| 5,486,370 A | 1/1996 | Bivens | |
| 5,595,107 A | 1/1997 | Bivens | |
| 5,709,899 A | 1/1998 | Bivens | |
| 5,731,024 A | 3/1998 | Bivens | |
| 5,870,945 A | 2/1999 | Bivens | |
| 5,877,096 A | 3/1999 | Stevenson et al. | |

(Continued)

OTHER PUBLICATIONS

Derwent Abstract for DE Publication 20203333, published May 29, 2002, author unknown.*

*Primary Examiner* — Joseph Drodge
(74) *Attorney, Agent, or Firm* — Chambliss, Bahner & Stophel, P.C.

(57) ABSTRACT

A method for filtering particulate material from cooking oil used in a frying process at a filtration temperature within the range of 250° F. to 400° F. includes providing a filter comprising a non-woven panel of directionally or randomly oriented fibers of synthetic material, and exposing the filter to the cooking oil at the filtration temperature while drawing the cooking oil therethrough.

22 Claims, 6 Drawing Sheets

U.S. PATENT DOCUMENTS

| | | |
|---|---|---|
| 5,972,814 A | 10/1999 | Schild, III et al. |
| 6,235,210 B1 | 5/2001 | Saksena |
| 6,312,598 B1 | 11/2001 | Munson et al. |
| 6,322,615 B1 | 11/2001 | Chapman |
| 6,371,307 B1 | 4/2002 | Eskes |
| 6,572,764 B2 | 6/2003 | Mullaney, Jr. |
| 6,746,517 B2 * | 6/2004 | Benson et al. .......... 95/273 |
| 6,820,540 B1 | 11/2004 | Bivens |
| 6,955,118 B1 | 10/2005 | Bivens |
| 7,311,038 B2 | 12/2007 | Savage |

* cited by examiner

METHOD FOR FILTERING COOKING OIL USED IN FRYING PROCESS

CROSS-REFERENCE TO RELATED APPLICATIONS

This application is a divisional of U.S. patent application Ser. No. 11/402,769, entitled "Filter And Filtration Method For Cooking Oil Used In Frying Process", which was filed on Apr. 13, 2006. application Ser. No. 11/402,769 is a continuation-in-part of U.S. patent application Ser. No. 11/179,933, entitled "Filter and Method for Cooking Oil Filtration", which was filed on Jul. 12, 2005. application Ser. No. 11/179,933 claims the benefit of U.S. Provisional Patent Application No. 60/587,347 entitled, "Felt Filter for Cooking Oil," which was filed on Jul. 13, 2004.

FIELD OF THE INVENTION

This invention relates generally to the filtering of cooking oil used in deep-fat frying. A preferred embodiment of the invention comprises a filter that is useful for filtering of such cooking oil at a temperature near that which is commonly encountered in deep-fat frying.

BACKGROUND AND DESCRIPTION OF THE PRIOR ART

Cooking oil is extensively used in restaurants and in the food preparation industry for cooking of various food items. One common use for cooking oil is in the cooking process known as deep-fat frying. Such frying is frequently carried out in relatively deep containers of cooking oil, with the food item to be cooked being immersed in cooking oil that is heated to a temperature between about 250° F. and about 400° F. (about 121° C. and about 205° C.), and in most cases, to a temperature between about 315° F. and about 385° F. (about 158° C. and about 196° C.). As food items are introduced into the fryers and cooking proceeds, the cooking oil becomes contaminated with suspended food particles, blood, water, flour, breading, spices and other introduced contaminants. These contaminants will react with each other and with components of the cooking oil to degrade the cooking oil, resulting in a change in color, a change in alkalinity or acidity, a reduction in thermal efficiency and an increase in the potential for smoking or burning. In addition, dispersed and suspended particulate will conduct heat away from the food product, increasing frying times and heating energy requirements. Furthermore, the exposure of these introduced contaminants to the air and the heat of cooking over time will cause suspended particles to become charred or carbonized. This carbonization is frequently accompanied by chemical breakdown of the cooking oil, resulting in the production of impurities such as free fatty acids, polymers, alkalines and other polar compounds. All of these contaminants can cause the effectiveness of the cooking oil to degrade. Furthermore, such contaminants may attach themselves to food products during the frying process, thereby raising the potential for adversely affecting the taste of the food products and/or creating negative health issues upon consumption.

Restaurants and food preparation facilities frequently fry food items in batches, and they generally do not discard the cooking oil after cooking a single batch. Consequently, filtration is commonly employed to control or reduce contaminants and to extend the useful life of the cooking oil. In typical restaurant operations, the cooking oil in a deep-fat fryer is filtered once or twice each day, most often by employing a portable batch-type filtration device. However, despite such filtration, a typical restaurant facility that utilizes a conventional filtration process generally discards its cooking oil every five to ten days due to accumulated particulate contamination and degradation.

Conventional filtration devices generally operate by draining the cooking oil from the fryer into a filtration container and then cycling the cooking oil through a filter. Generally, when the filtration operation is begun, the cooking oil is at or near cooking temperature, and batch filtration continues until a subjective determination is made that the filtering process has achieved a desired result. After filtration, usually comprising multiple passes through the filter, the filtered cooking oil is returned to the fryer. It is not unusual for cooking oil to be filtered by passing it through a conventional filter for 30 minutes or longer. Depending on the amount of time elapsed during filtration, the cooking oil may be as much as 285° F. (140° C.) or more below cooking temperature when it is returned to the fryer. Consequently, the filtered oil must be heated to raise it to cooking temperature prior to resuming frying operations.

Particulate separation is the essence and purpose of filtration. The efficiency of a particular filter material is measured by the size of particulate material that it can retain, the overall amount of particulate that can be retained, and the volume of filtrate that can flow through the filter in a given period of time at the operating pressure of the filtration device. Conventional filters often become laden with particulate material from the frying process in high volume operations, thus making it difficult to maintain an adequate flow of cooking oil through the filter. Under such circumstances, the speed of filtration is greatly reduced. Consequently, fryer operators may attempt to scrape the filter surface to reduce the accumulated particulate to increase the filtration flow.

Conventional filters used in filtration devices include those comprised of paper, a pad of bonded fibrous material such as cellulose fibers bound by a resin, and metal screens. Some filtration devices employ flat filters that are retained in a support frame; others employ filter envelopes that wrap around a spacing grid or frame. Conventional filter media types vary in their effectiveness. Paper filters are inexpensive; however, paper filters are fragile and are frequently damaged if scraped to remove accumulated particulate. Paper filters cannot generally be used for multiple filtration cycles. Consequently, if a restaurant filters its cooking oil twice a day using paper filters, it will most likely use two filters each day. Paper filters absorb cooking oil during the filtration process, and they provide limited separation efficiency, retaining particles within the range of 20-30 microns and larger. Cellulose filter pads also absorb cooking oil during filtration, and they are susceptible to damage if scraped. Cellulose pads are difficult to form in the shape of a filter envelope that wraps around a spacing grid, and are not usable for multiple filtration cycles. However, cellulose filter pads generally retain particles within the range of 1-5 microns and larger. Generally, paper filters and cellulose filter pads may be used to filter approximately 180-270 lbs (397-595 kg) of cooking oil before they must be replaced. Stainless steel filter screens are durable and may be reused indefinitely, but they are considerably more costly than paper filters and filter pads. Furthermore, they also provide limited separation efficiency, retaining particles within the range of 80-120 microns and larger.

Conventional filters generally provide passive surface filtration, in which the cooking oil is drawn through the filter surface by vacuum, retaining particles from the oil on the filter surface. In order to provide a measure of depth filtration, cooking oil to be filtered must be circulated through paper filters, cellulose pad filters and metal screen filters for 3-5 minutes in order to build a filter cake of particulate to effectively enhance the separation efficiency. The creation of such a filter cake provides interstitial sites for retaining particulate during subsequent filtration. Frequently, a powdered filter aid is used with conventional filter materials to increase filtration efficiency, primarily by increasing depth filtration. Such filter aids are dispersed in the cooking oil and form a powder cake on the filter surface (along with accumulated particulate contaminants) to increase the filtration surface area, and thereby enhance the removal of relatively small particles. Such filter powder, when accumulated as a filter cake on the filter, provides a plurality of channels permeable to liquid, yet more effective in mechanically filtering small particulates. The addition of a powdered filter aid thus provides additional depth filtration and generally results in the removal of smaller particles than can be removed by filtering through paper, cellulose pad or metal screen filters alone. For example, a use of paper filters in conjunction with a powdered filter aid will generally result in the retention of particles within the range of 1-5 microns and larger. A use of stainless steel filter screens in conjunction with a powdered filter aid will generally result in the retention of particles within the range of 5-10 microns and larger. A use of cellulose filter pads in conjunction with a powdered filter aid will generally result in the retention of particles within the range of 1-5 microns and larger.

Filter aids may also include adsorbents or neutralizing agents to provide active filtration in the form of chemical reaction or electrostatic bonding with contaminants, including free fatty acids and polymers, on a molecular level. In some instances, filter aids may be impregnated in filter paper or filter pads. However, a portion of the smaller particles of the filter powder will generally pass through the filter and remain in the cooking oil after filtration. Such particles may adhere to food items during the frying process, and they may react with components of the cooking oil at cooking temperatures to increase oil degradation. Filter aids can also alter the pH balance of the cooking oil. In addition, powdered filter aids, as well as paper and cellulose pad filters, absorb a certain amount of cooking oil during the filtration process. Since filter aids are discarded along with paper or cellulose pad filters when such filters are changed, or are washed from metal screen filters after each filtration cycle, the oil that is absorbed by the filter aids is discarded (along with the filter aid) after every filtration cycle. Such oil must be replaced periodically to insure proper frying operation.

Examples of filter aids include organic compounds such as diatomaceous earth, adiaphorous clay or pearlite, and silicates such as calcium silicate, aluminum silicate and magnesium silicate. Other filter aids include activated carbon, which may be employed to remove objectionable colors from the cooking oil and eliminate odor-causing components, and alkalis, which may be added to increase the pH of the cooking oil.

Generally, the amount of contaminants removed during the filtration process depends on the type of filter material used, the type and extent of filter aids used and the filtration cycle time.

Although filters of polyester and nylon felt materials have been employed for solid-fluid separation in wet and dry applications, the use of such materials for filtering cooking oils has not been practiced, especially as a part of a vacuum filtration process, because the relatively high cooking temperatures involved are generally at or above the recommended application temperatures for such materials. A survey of published information of manufacturers or distributors of non-woven polyester felt material, including Lantor Advanced Materials Group, National Nonwovens, Western Nonwovens, Inc., Southern Felt Company, Inc., Knowlton Specialty Papers, Inc., American Industrial Felt & Supply, and Sutherland Felt indicates that all of these manufacturers and distributors do not contemplate any application (filtration or otherwise) of polyester felt material in a high temperature environment such as is typically seen in frying operations. Furthermore, such manufacturers do not encourage the use of polyester felt materials in filtration applications (either wet or dry) at temperatures commonly encountered in deep-fat frying. Thus, for example, Sutherland Felt Company, a manufacturer of synthetic and other felts, recommends a filter application temperature no higher than 149° C. (300° F.) and American Felt & Filter Company recommends a continuous application temperature (in dry applications) no higher than 132° C. (270° F.).

It would be desirable if a filter material could be provided for deep-fat frying operations that would be more efficient than conventional filter materials. It would also be desirable if such a filter material could be provided that would increase the useful life of cooking oils used in such operations.

ADVANTAGES OF A PREFERRED EMBODIMENT OF THE INVENTION

Among the advantages of the invention is that it provides a filter material with improved particulate separation efficiency over conventional paper, cellulose pad and metal screen filters. Yet another advantage of the invention is that it provides a filter material which is characterized by depth filtration, but without the need for powdered filter aids. Such filter material contributes to improved quality in the fried food item, such as a more golden brown color, less detectable odor and crisper crust. In addition, such filter material increases the useful life of the cooking oil by removing fine particulates. Another advantage of the invention is that it provides a filter material that requires no pre-filtration circulation to create a filter cake, and is characterized by a high-volume flow-through rate, thereby decreasing the time required for filtration, reducing the load on the pump that is employed to circulate the cooking oil through the filter, reducing the heat loss in the cooking oil during filtration, and insuring that the fryer is put back into operation more quickly. Another advantage of the invention is that it reduces the amount of cooking oil that must be added to the fryer after filtration, since no appreciable amount of cooking oil is absorbed by the filter material and no oil-absorbing filter aid is required. Still another advantage of the invention is that it provides a filter material that may be used for multiple filtration cycles and can be easily cleaned between filtration cycles. Yet another advantage of the invention is that it provides a more efficient filter material that reduces the labor requirements for filtration.

Additional objects and advantages of this invention will become apparent from an examination of the drawings and the ensuing description.

Explanation of Technical Terms

As used herein, the term "cooking oil" refers to any of various substances which are in liquid form at cooking temperatures and which are used in frying food items, such as (but not limited to) vegetable oil, canola oil, saffron oil, sunflower oil, peanut oil and animal fat.

As used herein, the term "deep-fat frying" refers to a process by which a food item is wholly or partly submerged in cooking oil that is heated to a temperature sufficient to cook the food item.

As used herein, the term "synthetic felt filter" refers to a non-woven panel, sheet, web or batt of directionally or randomly oriented fibers of a synthetic material.

As used herein, the term "vacuum filtration" refers to a filtration process by which a vacuum is applied to a filter to draw cooking oil through the filter.

SUMMARY OF THE INVENTION

The invention comprises a filter for filtering particulate material from cooking oil used in a frying process, said filter comprising a non-woven panel of directionally or randomly oriented fibers of a synthetic material. In a preferred embodiment of the invention, a majority of the fibers comprising said non-woven panel have a size within the range of 1-25 denier, and a length within the range of 1.5-5 inches. It is also preferred that the material of the filter be affected by exposure to the cooking oil at a filtration temperature within the range of 250° F. to 400° F. such that the panel experiences a lateral dimensional shrinkage of 2-10% and a vertical dimensional expansion of at least about 20% upon exposure to the cooking oil at the filtration temperature for a period of time within the range of 15-120 seconds.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS

The invention is a filter for filtering particulate material from cooking oil used in a frying process, and comprises a non-woven panel, sheet, web or batt of directionally or randomly oriented fibers of a synthetic material. Preferably, a majority of such fibers will have a size within the range of 1-25 denier, and a length within the range of 1.5-5 inches. Preferred synthetic materials for use in such filters include polyester, polypropylene and nylon.

Figure 1:
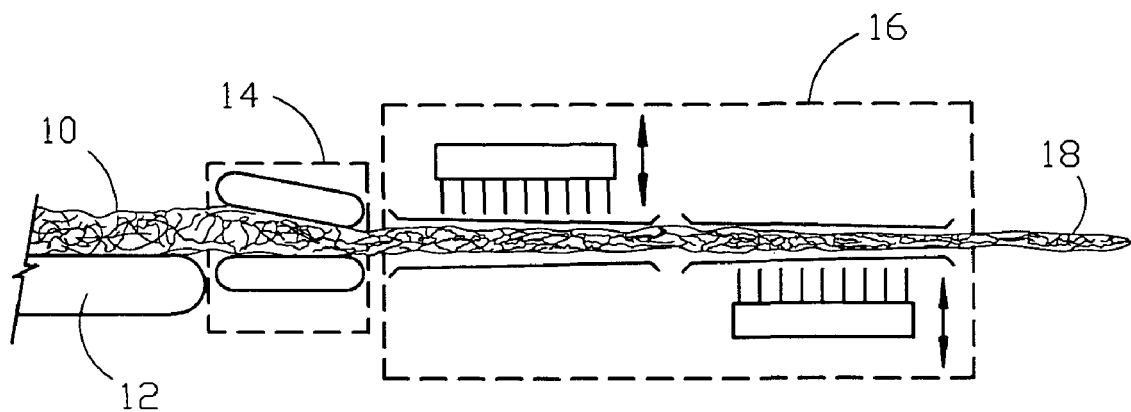
FIG. 1 is a schematic view illustrating several steps in the formation of a synthetic felt filter.
Figure 2:
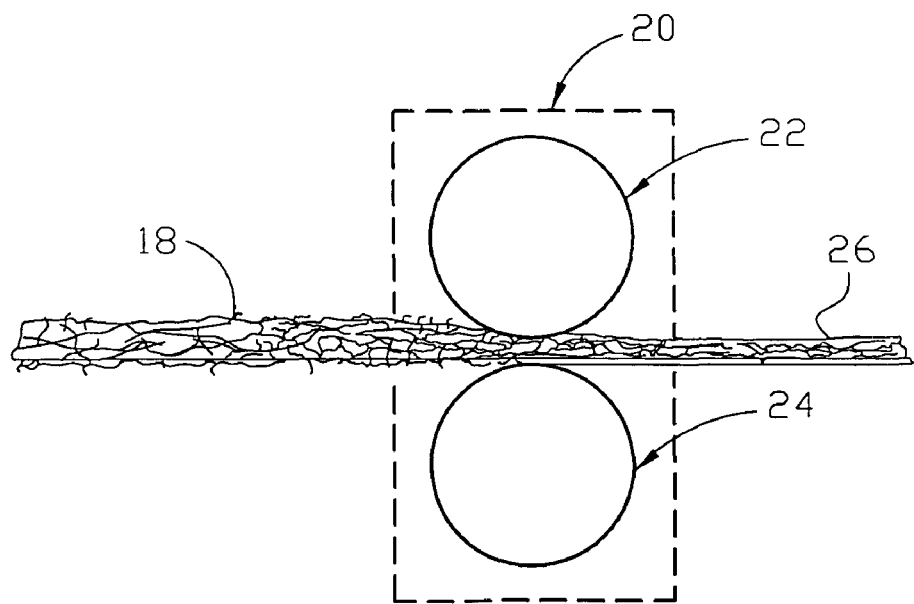
FIG. 2 is a schematic view illustrating a subsequent step in the formation of a synthetic felt filter.

A non-woven panel for use as a filter according to the invention may be manufactured by processes known to those having ordinary skill in the art. One such process is illustrated in FIGS. 1 and 2. As shown in FIG. 1, mat 10 is comprised of synthetic fibers which have preferably been deposited in successive layers onto floor apron 12. Mat 10 is fed through mat condenser 14 and needle-punched by conventional needle-punch apparatus 16, such as is commonly used in textile applications, to form condensed mat 18. Needle-punching of the synthetic fiber material causes the fibers to interengage in a panel, sheet, batt or mat of directionally or randomly oriented fibers comprising a coherent condensed structure. Referring now to FIG. 2, condensed mat 18 is preferably fed into treatment apparatus 20 comprising a pair of feed rolls 22 and 24 that serve to further compress the mat into panel 26. Preferably, the feed rolls are heated so as to heat the panel to a temperature within the range of 225°-275° F. In addition, one of the rolls may be heated to a higher temperature, for example to a temperature within the range of 420°-450° F., to glaze a surface of the panel that will first come into contact with the cooking oil to be filtered. Such glazed surface will comprise partially-melted fibers providing a relatively smooth surface. Glazing a surface does not materially contribute to improved filtration; however, a glazed surface is more easily scraped or washed to remove collected particles. Glazing may also be carried out in a subsequent process, or by any of various methods known to those having ordinary skill in the art to which the invention relates. In an alternative embodiment, a surface of the panel that will first come into contact with the cooking oil to be filtered may be treated by a singeing process by applying a flame to the surface to melt extending fibers. A singed surface is not as desirable as a glazed surface, however, because a singed surface is more likely to exhibit surface irregularities.

Figures 3, 6, 7:
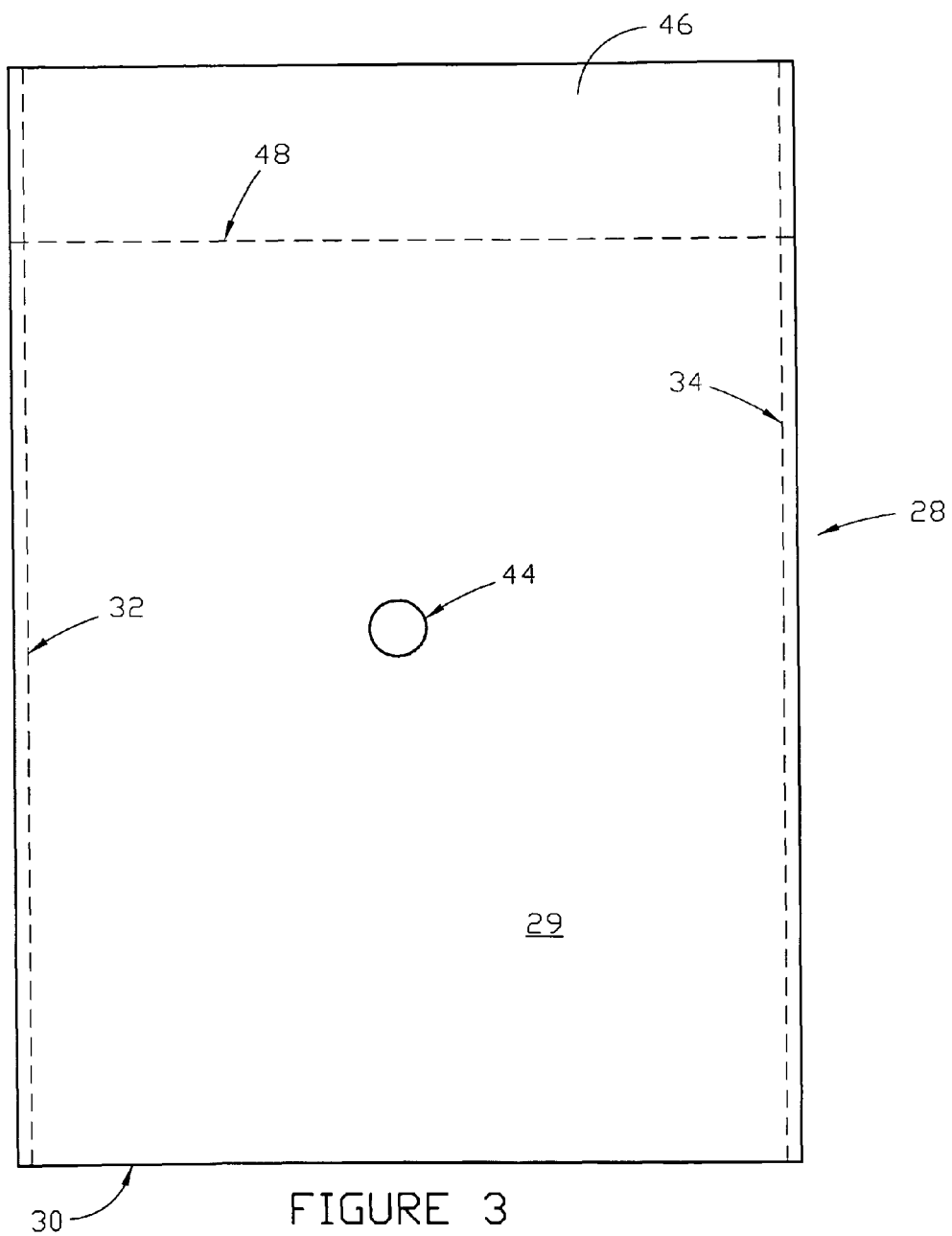
FIG. 3 is a front view of one embodiment of a filter comprised of synthetic felt filter material.
FIG. 6 is a front view of a retaining clip that is adapted to be used in connection with the filter embodiment of FIG. 3.
FIG. 7 is an end view of the retaining clip of FIG. 6.
Figure 5:
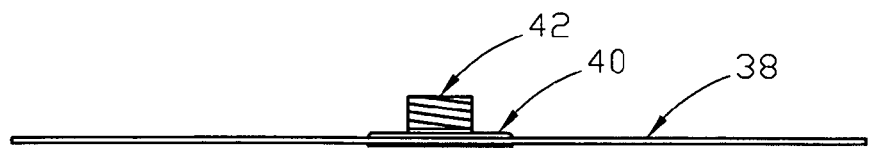
FIG. 5 is an end view of the preferred spacer grid of FIG. 4.
Figure 4:
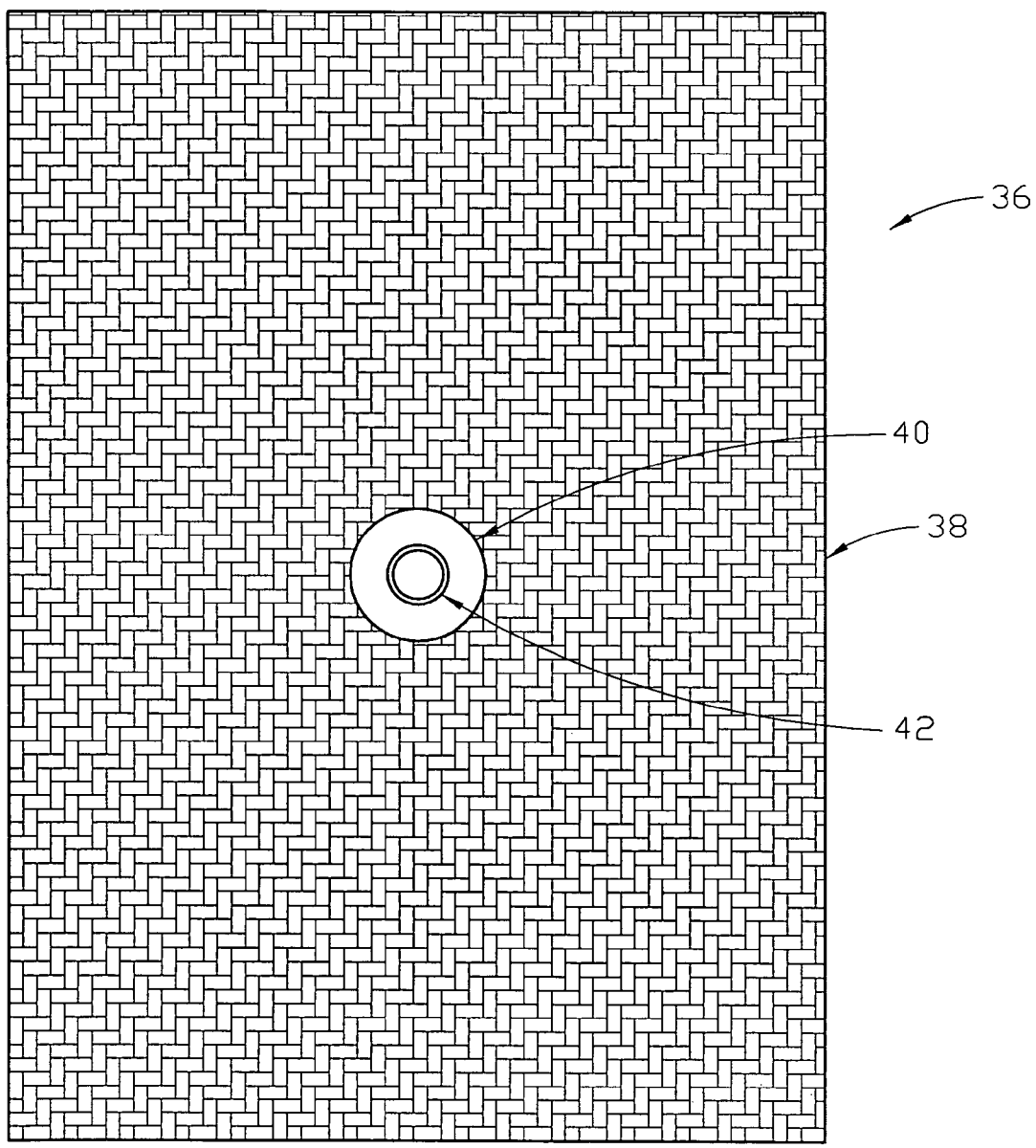
FIG. 4 is a front view of a preferred spacer grid that is adapted for use with the filter envelope of FIG. 3.

Referring now to FIG. 3, a first embodiment of a synthetic felt filter is illustrated. Filter 28 comprises an envelope made from one or more sheets or panels of synthetic felt material that are adapted for use with a filtering apparatus for a fryer of the type commonly used in cooking operations. Preferred filter envelope 28 is comprised of a single sheet of synthetic felt material having a front panel 29 and a back panel 31 (not shown in FIG. 3). This sheet of synthetic felt material is folded along bottom line 30 and stitched together along stitch lines 32 and 34 to form a pocket (between panels 29 and 31) for receiving a spacer grid such as grid 36 (shown in FIGS. 4 and 5). Spacer grid 36 is preferably comprised of a tubular slit plate 38 of aluminum or stainless steel, to which attachment lug 40 and threaded port 42 are attached. Spacer grid 36 is placed within filter envelope 28 so that threaded port 42 extends through central hole 44. Upper portion 46 of envelope 28 is then folded over at fold line 48, and retaining clip 50 (shown in FIGS. 6 and 7) is placed over the folded portion to maintain envelope 28 in the folded position. Threaded port 42 is adapted for the attachment of the filter envelope to a conventional filtration vacuum line (such as is shown in FIGS. 8 and 9) by means of attachment structures (not shown) which are known to those having ordinary skill in the art to which the invention relates.

Figure 8:
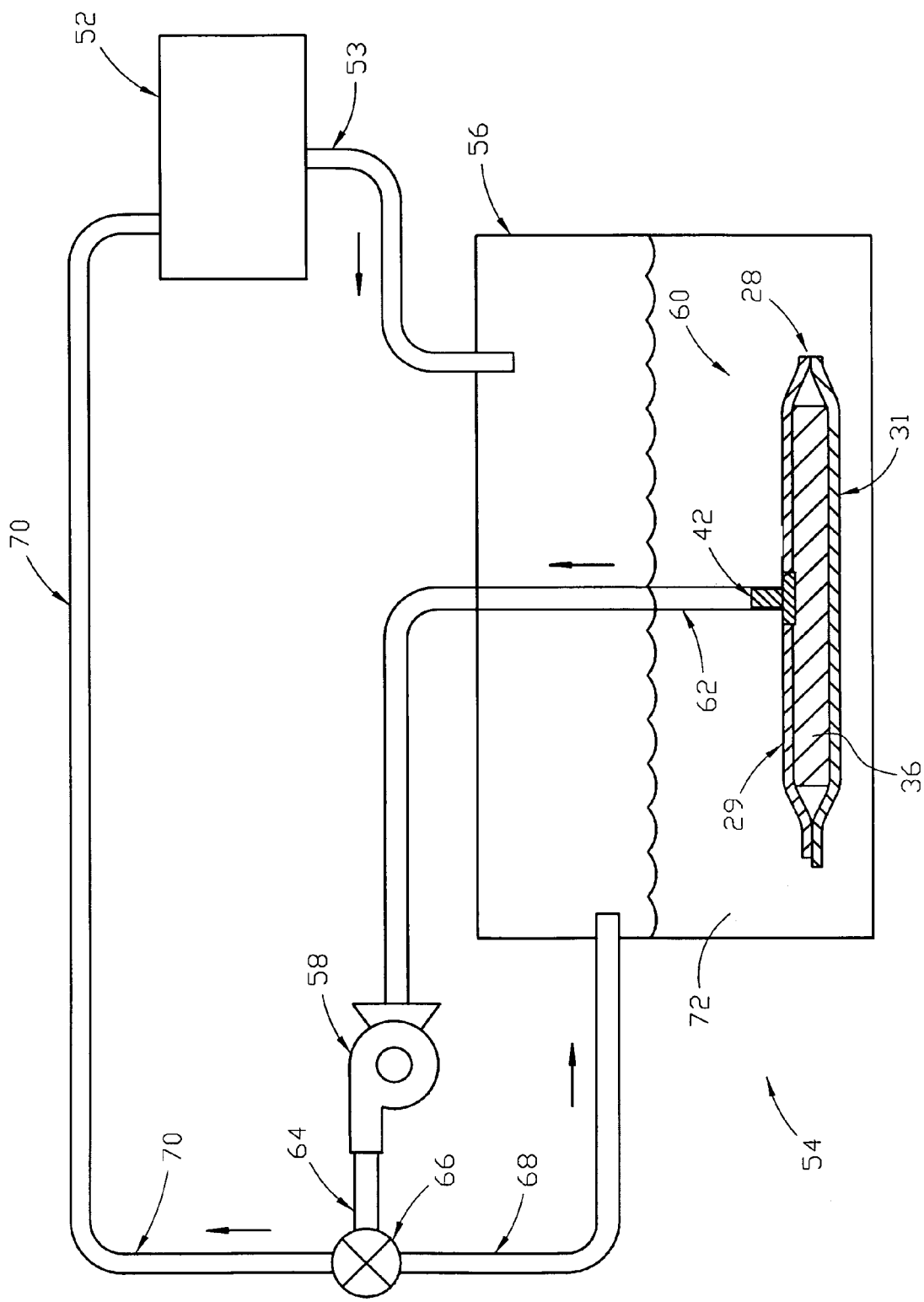
FIG. 8 is a schematic illustration of a first embodiment of a deep-fat fryer and filtration system, illustrating a filtration process.

Referring now to FIG. 8, fryer 52 (shown schematically) is a type such as is commonly used in cooking operations. Drain line 53 is employed to drain the cooking oil from fryer 52 to filtering apparatus 54. Filtering apparatus 54 operates by a vacuum filtration process and includes container 56, pump 58, filter 60, vacuum line 62, pump line 64, directional valve 66, filtration return line 68 and fryer return line 70. Filter 60 includes envelope 28 and spacer 36, which includes threaded port 42 to which vacuum line 62 is attached in a manner known to those having ordinary skill in the art to which the invention relates. Typically, the cooking oil (indicated at 72) is at or near cooking temperature, generally between about 250° F. and about 400° F. (about 121° C. and about 205° C.) and more likely between about 315° F. and about 385° F. (about 158° C. and about 196° C.), when it is drained into container 56 of filtering apparatus 54. When the cooking oil has been removed from fryer 52, pump 58 may be activated to apply a vacuum to draw the cooking oil through filter 60. This process may be repeated, if desired, for multiple cycles, although good results may be usually obtained in a single pass through the filter. Consequently, if directional valve 66 is set to return the cooking oil to container 56 for multiple filtering passes, the oil will pass through filter 60, vacuum line 62, pump 58, pump line 64, valve 66, filtration return line 68 and back into container 56. If only a single filtration pass through filter 60 is desired (or after multiple passes through the filter), directional valve 66 may be set to return the filtered cooking oil to fryer 52. In such event, the oil will pass through filter 60, vacuum line 62, pump 58, pump line 64, valve 66, fryer return line 70 and back into container 52.

Figure 9:
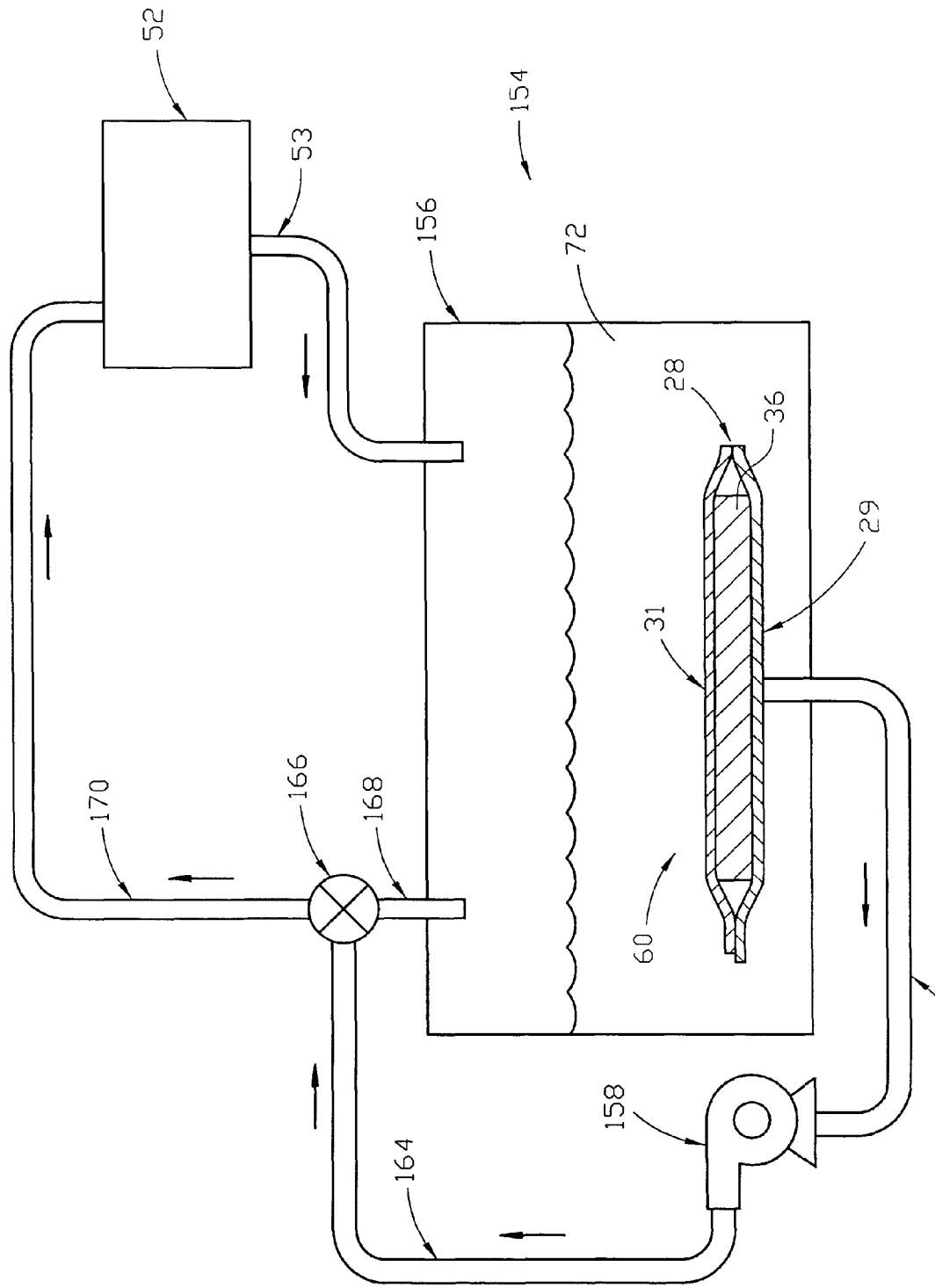
FIG. 9 is a schematic illustration of a second embodiment of a deep-fat fryer and filtration system, illustrating a filtration process.

FIG. 9 illustrates a vacuum filtration process carried out utilizing a second embodiment of the filtration apparatus. As shown therein, drain line 53 is attached to fryer 52 to drain the cooking oil into filtering apparatus 154. Filtering apparatus 154, like filtration apparatus 54, operates by a vacuum filtration process and includes container 156, pump 158, filter 60 (which is inverted from its position in filtration apparatus 54), vacuum line 162, pump line 164, directional valve 166, filtration return line 168 and fryer return line 170. Filter 60 includes envelope 28 and spacer 36, which includes a threaded port (not shown) to which vacuum line 162 is attached in a manner known to those having ordinary skill in the art to which the invention relates. When the cooking oil has been removed from fryer 52, pump 158 may be activated to apply a vacuum to draw the cooking oil through filter 60. This process may be repeated, if desired, for multiple cycles, although good results may be usually obtained in a single pass through the filter. Consequently, if directional valve 166 is set to return the cooking oil to container 156 for multiple filtering passes, the oil will pass through filter 60, vacuum line 162, pump 158, pump line 164, valve 166, filtration return line 168 and back into container 156. If only a single filtration pass through filter 60 is desired (or after multiple passes through the filter), directional valve 166 may be set to return the filtered cooking oil to fryer 52. In such event, the oil will pass through filter 60, vacuum line 162, pump 158, pump line 164, valve 166, fryer return line 170 and back into container 52.

Figure 10:
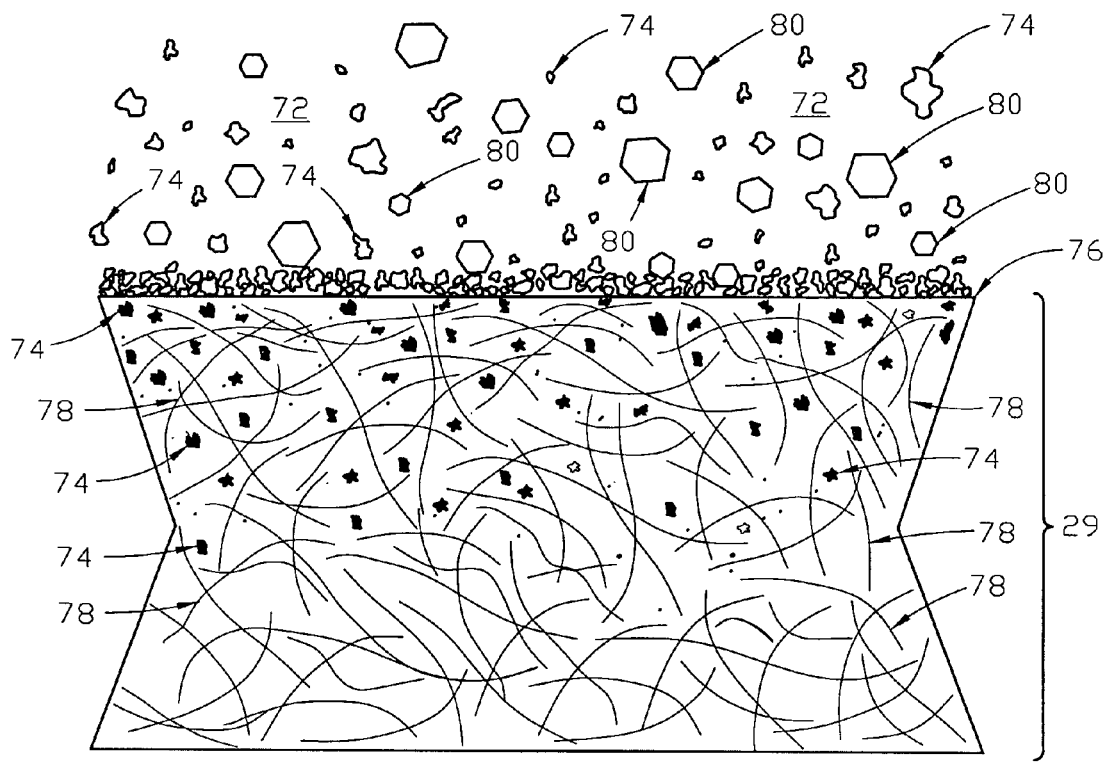
FIG. 10 is a cross-sectional side-view of a portion of a synthetic felt filter illustrating the depth filtration characteristics of a preferred embodiment of the invention.

Referring now to FIG. 10, a detailed view of front panel 29 of synthetic felt filter envelope 28 is shown. As cooking oil 72 passes through panel 29 of filter envelope 28, particulates 74 of various particle sizes become lodged at the filter surface 76 or among intermediate fibers 78. As filtration continues, particulates are accumulated on the filter surface 76. As cooking oil 72 that has passed through front panel 29 continues through spacer grid 36 (not shown in FIG. 10) and back panel 31 (not shown in FIG. 10) of filter envelope 28, particulates 74 also become lodged at the filter surface or intermediate felt fibers of back panel 31 in like manner.

Although not required for effective filtration using a synthetic felt filter according to the invention, particles 80 of powdered filter aids may also be dispersed in the cooking oil 72. Such particles will accumulate with particulate contaminants 74 on the filter surface 76 or among intermediate fibers 78 of panel 29. An accumulation of particulate contaminants 74 and filter aid particles 80 into a filter cake may enhance the filtration process, however, in the same way that it enhances filtration using conventional filter materials.

Referring again to FIGS. 8 and 9, after cooking oil 72 is cycled through filter 60 and returned to fryer 52, filter 60 may be cleaned by scraping if desired. Since the synthetic felt material of filter 60 presents a surface 76 that is not readily torn or separated, scraping of the surface of filter envelope 28 will result in the removal of collected contaminants on the surface without impairing the integrity of the filter material.

If further cleaning of filter 60 is required, filter 60 may be removed from vacuum line 62 (or 162), and spacer grid 36 may be removed from the filter envelope. The filter envelope may then be washed using conventional washing methods, such as by placing the filter envelope in a conventional dishwasher or washing machine, or by washing the filter envelope by hand in a sink. Spacer grid may also be rinsed or washed to clean it. Upon cleaning of the filter envelope, spacer grid 36 may be reinserted into filter envelope 28, and the reassembled filter 60 may be re-attached to vacuum line 62 (or 162). The filter 60 is thus prepared for re-use in a subsequent filtration cycle. Such cleaning cycles may be continued until replacement of filter envelope 28 is deemed necessary.

Figure 11:
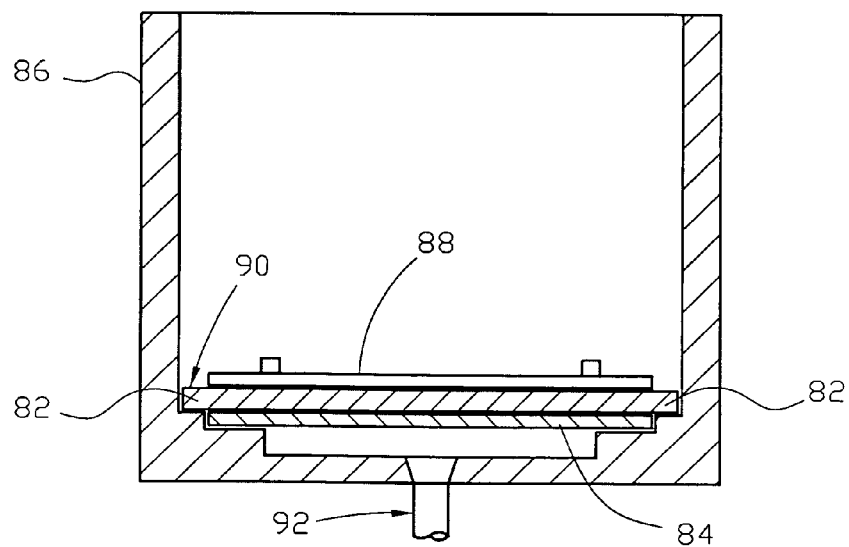
FIG. 11 is a cross-sectional view of a third embodiment of a filtration system which includes a synthetic felt filter.

An alternative embodiment of the invention is shown in FIG. 11, in which a synthetic felt filter comprising filter panel 82 is placed on filter support 84 in filtration apparatus container 86. The principle of operation of this filtration apparatus is essentially the same as that of filtration apparatus 54 of FIG. 8 or filtration 154 of FIG. 9. Weighted hold-down plate 88 is positioned above filter panel 82, thereby securing panel 82 in place. The hold-down plate and filter support 84 include passages (not shown) for the passage of cooking oil through panel 82. Preferably, surface 90 of panel 82 is glazed. When cooking oil has been drained from a fryer (not shown) into container 86, a pump (not shown, but similar to pump 58 of apparatus 54) may be activated to draw the cooking oil through filter panel 82 and vacuum line 92. This process may be repeated, if desired, for multiple cycles, although good results may be usually obtained in a single pass through the filter. Panel 82 may be scraped for cleaning purposes or may be removed and cleaned by washing.

In a series of tests, a synthetic felt filter comprised of polyester felt in the configuration of filter 60 was used for batch filtration of contaminated cooking oil in a commercial cooking environment.

Example 1

In a first test, polyester felt filter material was used to filter a quantity of discarded cooking oil having a free fatty acid content of 2.33% by volume. Three filter envelopes were constructed, each filter envelope comprising a unique polyester filter. The unique polyester filters comprised:

Filter Material 1 (FM-1): A polyester felt filter having a porosity of 509.7 liters per minute (18 cubic feet per minute), a unit weight of 542.5 grams per square meter (16 ounces per square yard) and a thickness of 0.17 centimeters (0.067 inches).

Filter Material 2 (FM-2): A polyester felt filter having a porosity of 141.6 liters per minute (5 cubic feet per minute), a unit weight of 440.8 grams per square meter (13 ounces per square yard) and a thickness of 0.09 centimeters (0.035 inches).

Filter Material 3 (FM-3): A polyester felt filter having a porosity of 254.9 liters per minute (9 cubic feet per minute), a unit weight of 440.8 grams per square meter (13 ounces per square yard) and a thickness of 0.10 centimeters (0.039 inches).

Porosity was measured according to industry standards at 1.27 cm (0.5 inch) $H_2O$ water column, using a standard Frazier Scientific Instrument porosity machine.

Each of the three filter envelopes were used to conduct three filtering operations analogous to a commercial batch filtering operation. The cooking oil was heated to 177° C. (350° F.) prior to each filtering operation. The flow rates of cooking oil through the filter material and the quantity of particulate retained during filtration were determined and are listed in Table 1. The flow rate did not decline during the second and third filtering operation (in relation to the first filtering operation) for any of the filtering operations, indicating that there was no structural deterioration of the synthetic felt filter material. The synthetic felt filters were then examined to determine if any heat degradation had occurred. No evidence of thermal degradation was observed.

TABLE 1

| Description | Free Fatty Acids Removed (% of original volume) | Flow-rate L/min (gpm) |
|---|---|---|
| FM-1 (1$^{st}$ pass) | 2.18 | 6.06 (1.6) |
| FM-1 (2$^{nd}$ pass) | 2.22 | 6.62 (1.75) |
| FM-1 (3$^{rd}$ pass) | 2.26 | 6.32 (1.67) |
| FM-2 (1$^{st}$ pass) | 2.22 | 6.43 (1.7) |
| FM-2 (2$^{nd}$ pass) | 2.26 | 6.28 (1.66) |
| FM-2 (3$^{rd}$ pass) | 2.26 | 6.66 (1.76) |
| FM-3 (1$^{st}$ pass) | 2.23 | 6.06 (1.6) |
| FM-3 (2$^{nd}$ pass) | 2.25 | 6.51 (1.72) |
| FM-3 (3$^{rd}$ pass) | 2.28 | 6.36 (1.68) |

Example 2

A separate round of testing was conducted to measure the performance of a synthetic felt filter comprised of polyester felt material of the composition of FM-1 of Example 1 in batch filtration over an extended period of time. A first test was conducted at 177° C. (350° F.), which is a common frying temperature in the restaurant industry. A second test was conducted at 196° C. (385° F.). The flow rate of the cooking oil was measured to determine if the filter media remained effective after exposure to cooking oil at these temperatures for an extended period. Table 2 provides a summary of the results:

TABLE 2

| Test No. | Initial Flow (L/min) | Initial Thickness (cm) | Temp (° C.) | Exposure Time (min) | Result Flow (L/min) | Result Thickness (cm) | Shrinkage Length/Width (%) |
|---|---|---|---|---|---|---|---|
| 1 | 30.3 | 0.17 | 177 | 240 | 30.3 | 0.21 | 2%/3.5% |
| 2 | 30.3 | 0.16 | 196 | 240 | 32.2 | 0.22 | 4.5%/7% |

At 177° C., the flow rate remained constant after exposure for four hours, and the polyester felt filter experienced shrinkage across the length of 2% and across the width of 3.5%. The filter's thickness experienced an increase of 22%.

At 196° C., the flow rate increased slightly, approximately 6%, after exposure for four hours. The polyester media experienced shrinkage across the length and the width of 4.5% and 7%, respectively. However, the polyester media experienced a 38% expansion across its thickness.

In a subsequent test, a quantity of the same polyester felt material was soaked in cooking oil for a period of four hours at ambient temperature of approximately 24° C. (75° F.). No measurable difference in length, width or thickness of the filter material was observed after such exposure, confirming that the shrinkage in length and width and the increase in thickness that was experienced resulted from exposure of the synthetic filter material to the high cooking temperatures.

Applicants have observed that the shrinkage across the length and width of the filter effectively reduces lateral interstitial openings (as used herein, the term "lateral" indicates a direction that is generally perpendicular to the direction of flow of the cooking oil). Applicants have also observed that the expansion across the thickness of the filter increases the vertical interstitial openings (as used herein, the term "vertical" indicates a direction that is parallel to the direction of flow). The increase in the thickness of the polyester felt filter at commonly encountered cooking temperatures results in increased filter depth and corresponding depth filtration benefits. Further, the constant flow rate indicates that filtering capacity of the polyester filter is maintained, even under temperature conditions in excess of published recommendations of various manufacturers of polyester felt materials. Upon visual inspection, no degradation of the synthetic felt filter material was observed.

Similar tests of nylon filter materials having porosities within the range of 424.8-708 liters per minute (15-25 cubic feet per minute), a unit weight of 542.5 grams per square meter (16 ounces per square yard), and thicknesses within the range of 0.17-0.20 centimeters (0.067-0.079 inches) indicate an equivalent or greater propensity to shrinkage of interstitial openings in the "lateral" direction and expansion of interstitial openings in the "vertical" direction (when compared to the polyester filter material described above) at temperatures in the range of 177° C. (350° F.) to 196° C. (385° F.).

Field Test Applications

In a series of field test applications, synthetic felt filters comprised of polyester were used in filtration units in multiple restaurants. This polyester filter material had the following characteristics: having porosities within the range of 509.8-793 liters per minute (18-28 cubic feet per minute), a unit weight of 508.6 grams per square meter (15 ounces per square yard), and a thickness of 0.17 centimeters (0.067 inches). For each field test, increased time between replacement of cooking oil was observed, with reported increases in cooking oil life ranging between 30% and 100%. This variance in the reported increase in cooking oil life is due, at least in part, to different standards used by different users to determine conditions indicating a need to change cooking oil. In addition, up to 20,000 pounds of cooking oil have been satisfactorily filtered in a commercial setting using a single filter envelope constructed according to the preferred embodiment described herein.

In the field test applications, the quantities of cooking oil required to be added after filtration to maintain a desired level of cooking oil were reported to be lower than when conventional filter materials were used by an average of approximately 7%. Such reduction in the amount of cooking oil added after filtration is attributed to the resistance of polyester to absorption of liquids and to the effectiveness of the synthetic felt filters in removing oil-absorbing particles.

A preferred embodiment of the synthetic felt filter envelope 28 of the present invention comprises a polyester felt filter media in a weight range of 1220.6 grams per square meter (6 ounces per square yard) to 4068.8 grams per square meter (20 ounces per square yard). In such preferred embodiment, each panel 29 or panel 31 of a filter envelope 28 is constructed of a length and width determined as follows: the Calculated Length is the length necessary to effectively encompass a spacer, including any necessary increase to allow for closing of the panel and connection to a corresponding panel. The Calculated Width is the width necessary to effectively encompass the spacer, including any necessary increase to allow for closing of the panel and connection to a corresponding panel. A filter envelope 28 is constructed from panels having a Panel Length and a Panel Width, wherein the Panel Length is the Calculated Length plus a Length Shrinkage Allowance and the Panel Width is the Calculated Width plus a Width Shrinkage Allowance. In a preferred embodiment of the invention, the Length Shrinkage Allowance is in the range of 2% to 10%, and the Width Shrinkage Allowance is in the range of 2% to 10%.

In an application involving folding an upper portion 46 of a filter envelope or other similar extension of one or more panels for installation purposes, the upper portion 46 or like extension dimension will be added to the Panel Length or Panel Width.

In an alternative embodiment of the invention employing a single synthetic felt filter panel (such as panel 82 of FIG. 11), the length and width of the preferred panel will also be subject to a Length Shrinkage Allowance in the range of 2% to 10%, and a Width Shrinkage Allowance in the range of 2% to 10%.

As a filter panel may be of any desired geometric structure, the foregoing principle may be more broadly applied by recognizing that a commercially-practical filter includes at least one filter panel, the filter panel having a lateral surface defining a filter area, each said filter panel having a peripheral margin for either extending beyond a filter support in an envelope-style filter or simply to provide an overlap in a single filter panel structure to prevent flow-by of unfiltered cooking oil. To practice the present invention utilizing polyester or nylon felt, it is necessary to initially construct the filter panel with a shrinkage margin of 2% to 10% of the lateral dimensions of the filter panel. Accordingly, it is necessary to determine the operational filter panel size parameters by determining the filter area and the operational peripheral margin of the filter panel and to construct the initial filter panel with a larger filter area and peripheral margin, the extent of the increase being the shrinkage margin.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A method for filtering cooking oil used in a frying process at a filtration temperature within the range of 250° F. to 400° F., said method comprising:
    (a) providing a filter comprising a non-woven panel of directionally or randomly oriented fibers of synthetic material;
    (b) exposing the filter to the cooking oil at the filtration temperature for a period of time sufficient to cause the panel to experience a shrinkage in a first dimension and an expansion in a second dimension while applying a vacuum to draw the cooking oil therethrough.

2. The method of claim 1 which includes providing a filter comprising a non-woven panel of directionally or randomly oriented fibers of synthetic material, said material being affected by exposure to the cooking oil at the filtration temperature such that the panel experiences a vertical dimensional expansion of at least about 20% upon exposure to the cooking oil at the filtration temperature for a period of time within the range of 15-120 seconds.

3. The method of claim 1 which includes providing a filter comprising a non-woven panel of directionally or randomly oriented fibers of synthetic material, with a majority of said fibers having a size within the range of 1-25 denier.

4. The method of claim 1 which includes providing a filter having a permeability within the range of 5-60 cubic feet of air per minute at 0.5 inch water pressure.

5. The method of claim 1 which includes providing a filter having a density within the range of 6-20 ounces per square yard of surface area.

6. A method for filtering cooking oil used in a frying process at a temperature within the range of 250° F. to 400° F., said method comprising:
    (a) providing a filter comprising a non-woven panel of directionally or randomly oriented fibers of synthetic material;
    (b) exposing the filter to a temperature within the range of 250° F. to 400° F. for a period of time sufficient to cause the panel to experience a shrinkage in a first dimension of 2-10% and an expansion in a second dimension;
    (c) applying a vacuum to draw the cooking oil through the filter.

7. The method of claim 6, which includes the step of exposing the filter to a temperature within the range of 250° F. to 400° F. for a period of time sufficient to cause the panel to experience a vertical dimensional expansion of at least about 20%.

8. The method of claim 6 which includes exposing the filter to the temperature for a period of at least about 15 seconds.

9. The method of claim 6 which includes exposing the filter to the temperature for a period of time within the range of 15-120 seconds.

10. The method of claim 6 which includes providing a filter comprising a non-woven panel of fibers selected from the group consisting of polyester, polypropylene and nylon.

11. The method of claim 6 which includes providing a filter comprising a non-woven panel of fibers, a majority of which have a size within the range of 1-25 denier.

12. The method of claim 6 which includes providing a filter comprising a non-woven panel of fibers, a majority of which have a length within the range of 1.5-5 inches.

13. A method for filtering cooking oil used in a frying apparatus, said method comprising:
    (a) providing a filtering apparatus comprising:
        (i) a container that is adapted to contain a quantity of cooking oil at a filtration temperature within the range of 250° F. to 400° F.;
        (ii) a filter assembly comprising a non-woven panel of directionally or randomly oriented fibers of synthetic material, said filter assembly being housed within the container;
        (iii) a pump that is adapted to pump cooking oil at the filtration temperature, said pump having an inlet and an outlet;
        (iv) an inlet line that connects the inlet of the pump to the filter assembly;
        (v) an outlet line that is attached to the outlet of the pump;

(b) placing a quantity of cooking oil at the filtration temperature in the container;

(c) operating the pump to cause the cooking oil to flow from the container through the filter assembly and out the outlet line for a period of time sufficient to cause the panel to experience a shrinkage in a first dimension and an expansion in a second dimension.

14. The method of claim 13 which includes providing a filtering apparatus including a filter assembly comprising a non-woven panel of directionally or randomly oriented fibers of synthetic material, said material being selected so that said panel experiences a lateral dimensional shrinkage of at least about 2% upon exposure to the filtration temperature for a period of at least about 15 seconds.

15. The method of claim 13 which includes providing a filtering apparatus including a filter assembly comprising a non-woven panel of directionally or randomly oriented fibers of synthetic material, said material being selected so that said panel experiences a vertical dimensional expansion of at least about 20% upon exposure to the cooking oil at the filtration temperature for at least about 15 seconds.

16. The method of claim 13 which includes providing a filtering apparatus including:
    (a) a directional flow valve that is mounted in the outlet line;
    (b) a fryer return line that is operatively connected to the directional flow valve and adapted to conduct cooking oil to the frying apparatus;
    (c) a filtration return line that is operatively connected to the directional flow valve and adapted to conduct cooking oil to the container;
wherein the directional flow valve may be selectively operated to permit the flow of cooking oil through the fryer return line or through the filtration return line.

17. The method of claim 13 which includes providing a filtering apparatus having:
    (a) a filter assembly comprising an envelope constructed from one or more non-woven panels of directionally or randomly oriented fibers of synthetic material; and
    (b) a spacer grid that is placed within the envelope.

18. The method of claim 17 which includes providing a filtering apparatus having a filter assembly comprising an envelope constructed from panels having a panel length and a panel width, wherein:
    (a) the panel length includes a length shrinkage allowance;
    (b) the panel width includes a width shrinkage allowance.

19. The method of claim 18 which includes providing a filtering apparatus having a filter assembly comprising an envelope constructed from panels having:
    (a) a length shrinkage allowance within the range of 2% to 10%;
    (b) a width shrinkage allowance within the range of 2% to 10%.

20. The method of claim 13 which includes providing a filtering apparatus having:
    (a) filter support within the container;
    (b) a filter assembly comprising a non-woven filter panel of directionally or randomly oriented fibers of synthetic material, that is located atop the filter support; and
    (c) a hold-down plate that is positioned above the filter panel;
wherein the filter support and the hold-down plate include passages for the passage of cooking oil through the filter panel.

21. The method of claim 20 which includes providing a filtering apparatus having a filter assembly comprising a filter panel having a panel length and a panel width, wherein:
    (a) the panel length includes a length shrinkage allowance;
    (b) the panel width includes a width shrinkage allowance.

22. The method of claim 21 which includes providing a filtering apparatus having a filter assembly comprising a filter panel having:
    (a) a length shrinkage allowance within the range of 2% to 10%;
    (b) a width shrinkage allowance within the range of 2% to 10%.

* * * * *